US006700620B1

(12) United States Patent
Arnold et al.

(10) Patent No.: US 6,700,620 B1
(45) Date of Patent: Mar. 2, 2004

(54) SURVEILLANCE CAMERA HOUSING WITH MOUNTING MEANS

(75) Inventors: Kathleen Elaine Arnold, York, PA (US); Theodore Leroy Jones, Akron, PA (US)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/253,081

(22) Filed: Feb. 19, 1999

(51) Int. Cl.[7] ........................ H04N 5/225; G03B 17/00; H01R 13/00

(52) U.S. Cl. ........................ 348/373; 396/427; 439/477

(58) Field of Search ................................ 348/373, 143; 439/477; 396/427

(56) References Cited

U.S. PATENT DOCUMENTS 4,019,045 A * 4/1977 Bassett ........................ 362/549
4,928,202 A * 5/1990 Gale et al. .................. 361/215
5,299,952 A * 4/1994 Hinds, Jr. ................... 439/376
5,477,441 A * 12/1995 Budnovitch et al. ........ 362/362
5,486,989 A * 1/1996 Compton .................... 362/291
5,535,109 A * 7/1996 Moore et al. ............... 362/267
5,610,656 A 3/1997 Bernhardt .................... 348/373
5,689,304 A * 11/1997 Jones et al. ................. 348/373
5,718,602 A 2/1998 Savoca ....................... 439/477
5,941,632 A * 8/1999 Wedell et al. .............. 362/410
5,984,252 A * 11/1999 Bograng et al. ............... 606/1
6,061,087 A * 5/2000 Schieltz et al. ............. 348/151

* cited by examiner

*Primary Examiner*—Wendy R. Garber
*Assistant Examiner*—James Hannett
(74) *Attorney, Agent, or Firm*—Kenyon & Kenyon

(57) ABSTRACT

A surveillance camera housing contains a crown plate with voids and radially extending flanges which engage corresponding radially extending flanges and voids in a mounting cap. A radial gasket is disposed upon said crown plate and electrical connectors are disposed within said radial gasket. In operation, the flanges of the crown plate are placed within the voids of the mounting cap and the flanges of the mounting cap are placed in the voids of the crown plate. When the housing is further lifted vertically a horizontal plane defined by the crown plate flanges rises above a horizontal plane defined by the mounting cap flanges. The housing is then rotated so that the crown plate flanges rest upon the mounting cap flanges.

22 Claims, 8 Drawing Sheets

SURVEILLANCE CAMERA HOUSING WITH MOUNTING MEANS

BACKGROUND OF THE INVENTION

This invention relates to the field of surveillance camera housings and specifically for a housing mounting means which places the interface for the electrical connections between a mount and a surveillance camera at the mechanical interface between the housing and a mount.

Camera housings like those in U.S. Pat. No. 5,689,304, require the installation of a separate mounting means. Video, power, and signal wires pass between a surveillance camera installed inside the housing, and a stationary mount, through this mounting means. The interface between the mounting means and the housing must be strong, aesthetically pleasing, and watertight. This requires that the housing be connected to the mounting means in a separate operation generally using fasteners flattening a gasket to produce the necessary seal.

After the mounting means is connected to a mount and to the housing, the housing subassembly contains unterminated wires extending therein which must be later connected to a surveillance camera by a technically qualified individual. The connection requires access inside the housing necessitating a larger housing to allow ingress of the camera. This arrangement thus requires costly installer time, a larger housing, and a field-actuated mechanical and electrical interface device.

Other prior art attempts like in U.S. Pat. No. 5,718,602, use a large longitudinally extending latch member which is deflected by a cam element and then supported in a recess in that same cam element. This arrangement relies on a biasing force on the latch member to rotate it back into the recess after it is deflected. The engagement is performed automatically relying on this biasing force and so is less reliable and safe than if a user actually causes the engagement. For example, if the latch member does not rotate into the recess and the camera and housing are released, the camera and housing will fall. Furthermore, the latch member necessarily has a length which increases the space required for the arrangement and thus decreases the aesthetic appearance.

Therefore, there exists a need in the art for a camera housing which can be easily coupled to a mount without the need for costly field technicians to install the device. The installation should be user controlled, inexpensive, reliable, structurally sound, and aesthetically pleasing.

OBJECTS AND SUMMARY OF THE INVENTION

In one aspect of the invention a surveillance camera housing includes a mounting means having a crown plate. The crown plate has a first radially extending flange for engagement with a corresponding second radially extending flange in a mounting cap. An electrical connector is disposed within the crown plate.

This aspect, like the ones which follow, yields a structurally strong, aesthetically pleasing, easily installed camera housing mount combination.

Another aspect of the invention is a method of connecting a housing including a mounting means, with a mount including a mounting cap. The method includes providing a mounting cap having a first flange; providing a mounting means with a second flange; and disposing electrical connectors in the housing. The method further includes inserting the housing with the mounting means into the mounting cap with the second flange entering the mounting cap in a position where the first flange is not present, and the first flange engaging the housing where the second flange is not present. The method still further includes rotating the housing thereby causing the first flange to be disposed below the second flange.

In yet another aspect of the invention, a surveillance camera housing coupled to a mounting through a mounting means includes a mounting cap having a first radially extending flange; and a housing having a crown plate. The crown plate has a second radially extending flange resting on the first radially extending flange. An electrical connector is disposed within the crown plate.

It is an object of the invention to provide a camera housing with a mounting means which allows for simple engagement of the housing with a mount.

It is another object of the invention to provide a method for combining a camera housing with a mount that is simple, aesthetically pleasing, yields reliable engagement, and is structurally sound.

These objects, as well as others, will become more apparent from the following description read in conjunction with the accompanying drawings where like reference numerals are intended to designate the same elements.

DETAILED DESCRIPTION OF THE PREFERRED EMBODIMENT(S)

Figure 1:
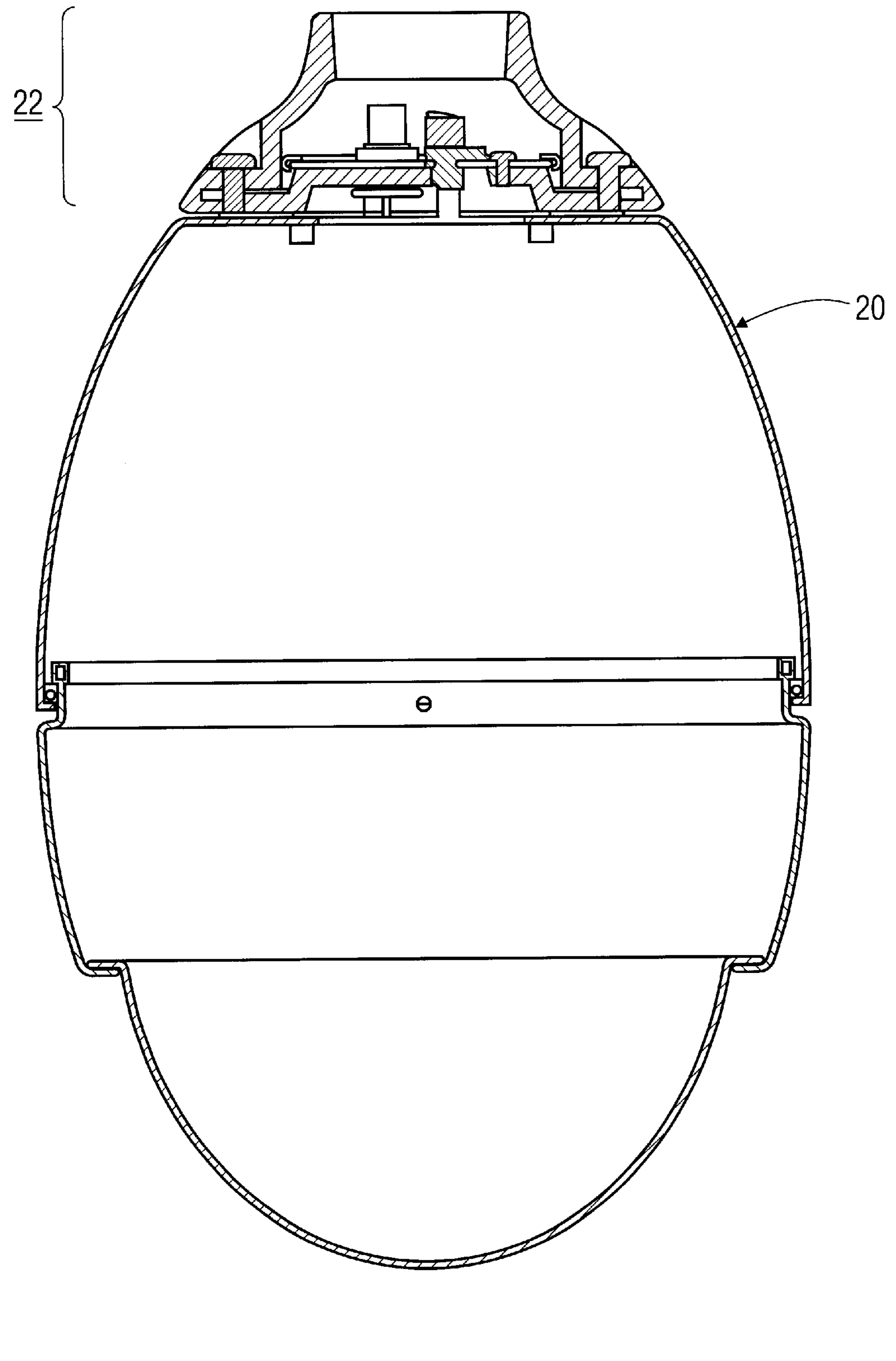
FIG. 1 is a side elevation view of a housing and cut-away view of a mounting means according to the invention.

Referring briefly to FIG. 1, a housing 20 is connected to a mounting means shown generally at 22. FIG. 3, details the components of mounting means 22 with a cut away cross-sectional view of mounting means 22 taken along the line B—B shown in the plan view of FIG. 2. A generally frustrum shaped sand cast aluminum mounting cap 24, having a tapered opening 26 at a first end, and radially extending interior flanges 28 at a second end, is shown engaged with a sand cast aluminum crown plate 30. Tapered opening 26 can contain internal threads 27 to mate with an externally threaded pipe mount (not shown). Mounting cap 24 further contains inward extensions 46 which extend parallel to a central axis 56 of the frustrum. Crown plate 30 has radially extending exterior flanges 32 for engaging with interior flanges 28. The underside of crown plate 30 is sealed in a watertight manner to the top of housing 20 with a seal 34. Seal 34 can be a flat gasket, a plurality of screws 35 (shown in FIG. 6), or any other conventional sealing means. Access to components inside the housing, such as address switches, can be realized by removing seal 34.

Figure 2:
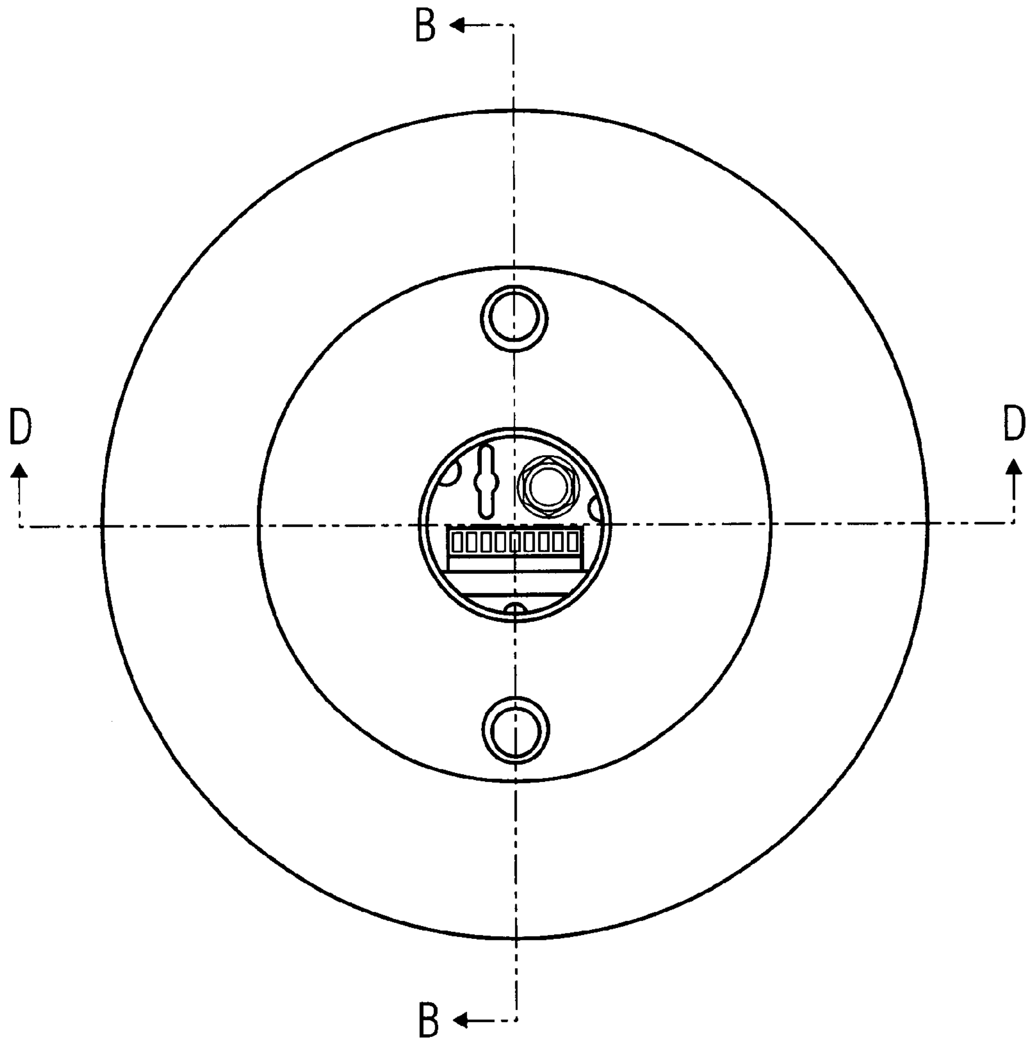
FIG. 2 is a plan view of FIG. 1.
Figure 3:
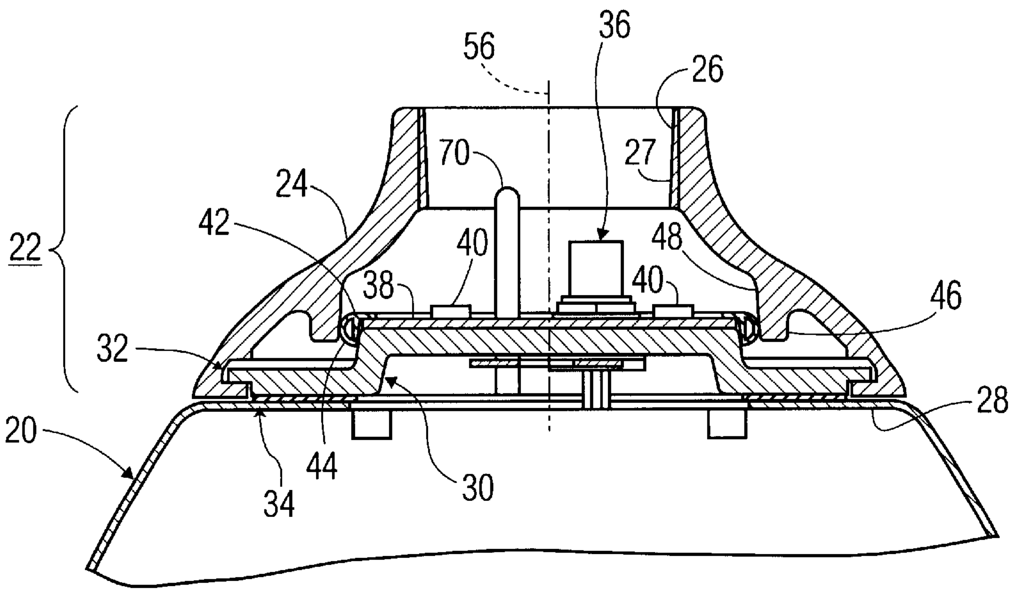
FIG. 3 is a cut-away side-elevational view taken along line D—D of FIG. 2 detailing a mounting means of the invention.
Figure 4:
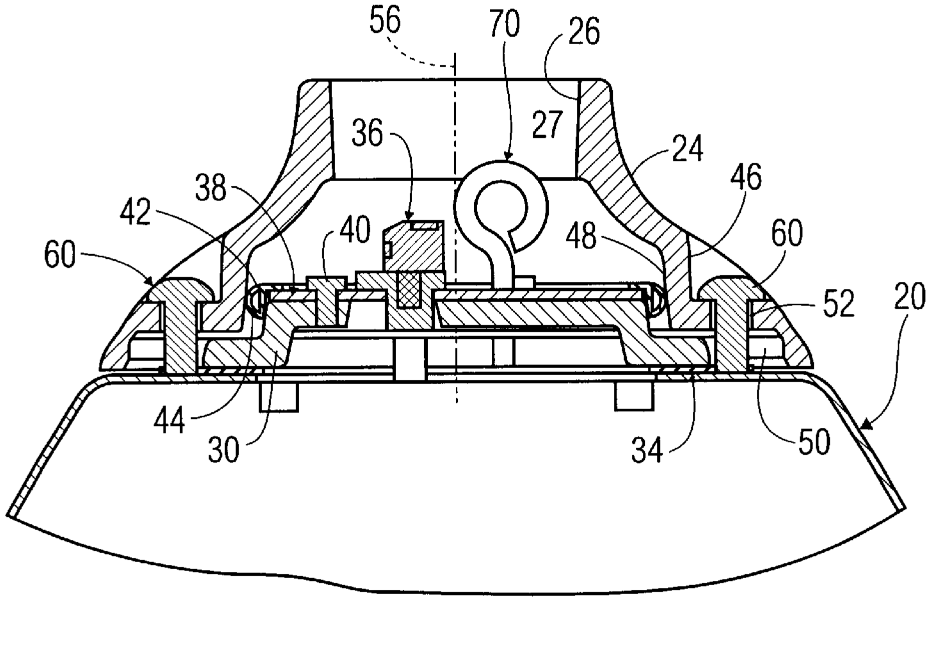
FIG. 4 is a cut-away side-elevational view taken along line B—B of FIG. 2 detailing a mounting means of the invention.

Referring now also to FIG. 4, there is a cut-away cross-sectional view of mating means 22 taken along line D—D shown in the plan view of FIG. 2. Electrical connectors 36 are disposed on, and electrically coupled to, an electrical connector plate 38 thereby providing an electrical connection between tapered opening 26 and the interior of housing 20. Electrical connector plate 38 is further coupled to crown plate 30 through screws 40. A hollow radial gasket 42 having a hollow, bulb-shaped, circumferential edge 44, is disposed on top of crown plate 30. Clearly, radial gasket 42 could also be affixed to mounting cap 24.

As can be discerned, when mounting cap 24 is placed on housing 20, inward extensions 46 deflect circumferential edge 44 downward thereby creating a seal pressure for all elements disposed radially external to circumferential edge 44. Conversely, all elements disposed within the hollow portion of radial gasket 42 are left unsealed and accessible through tapered entry 26. The use of a hollow, bulb-shaped circumferential edge 44 allows for significant radial deflection with minimal and equal amounts of both insertion and extraction forces which avoids the need of high cost precision tolerances.

Figure 5:
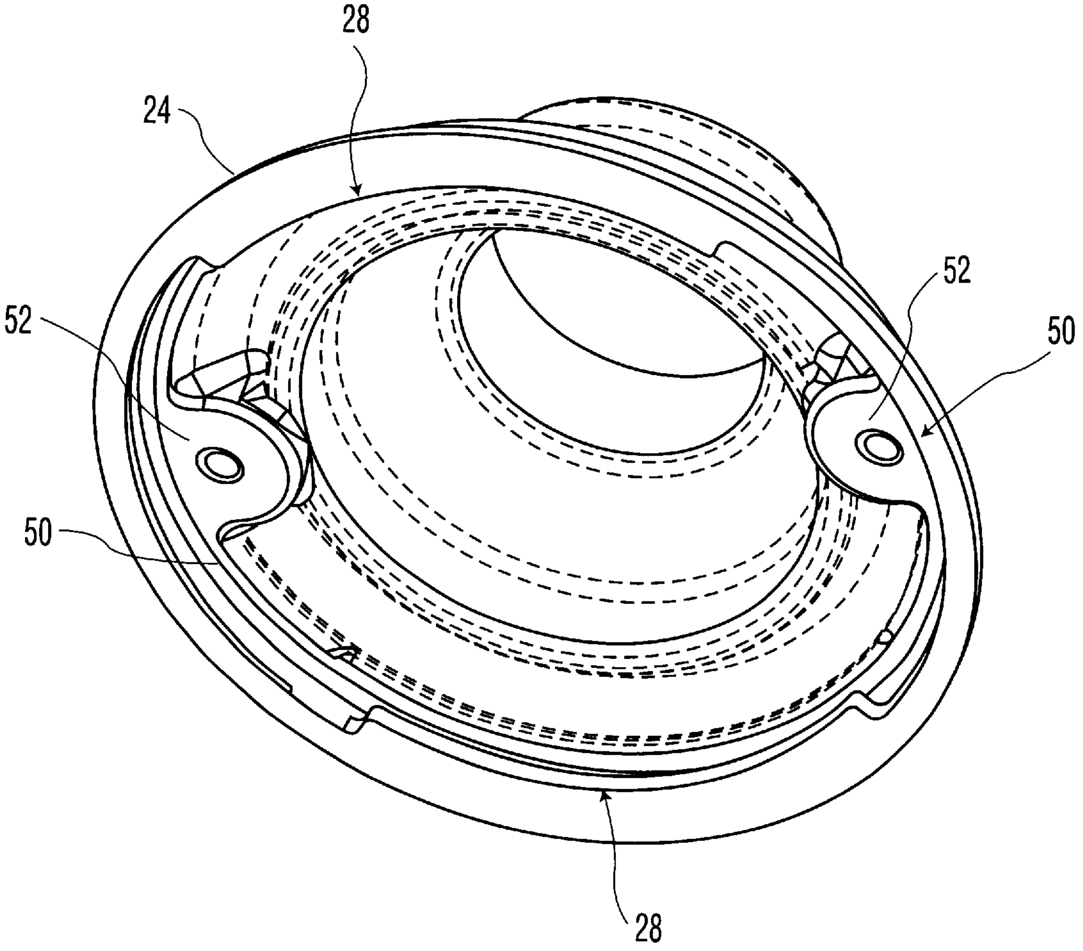
FIG. 5 is a bottom perspective view of a mounting cap used in the invention.
Figure 6:
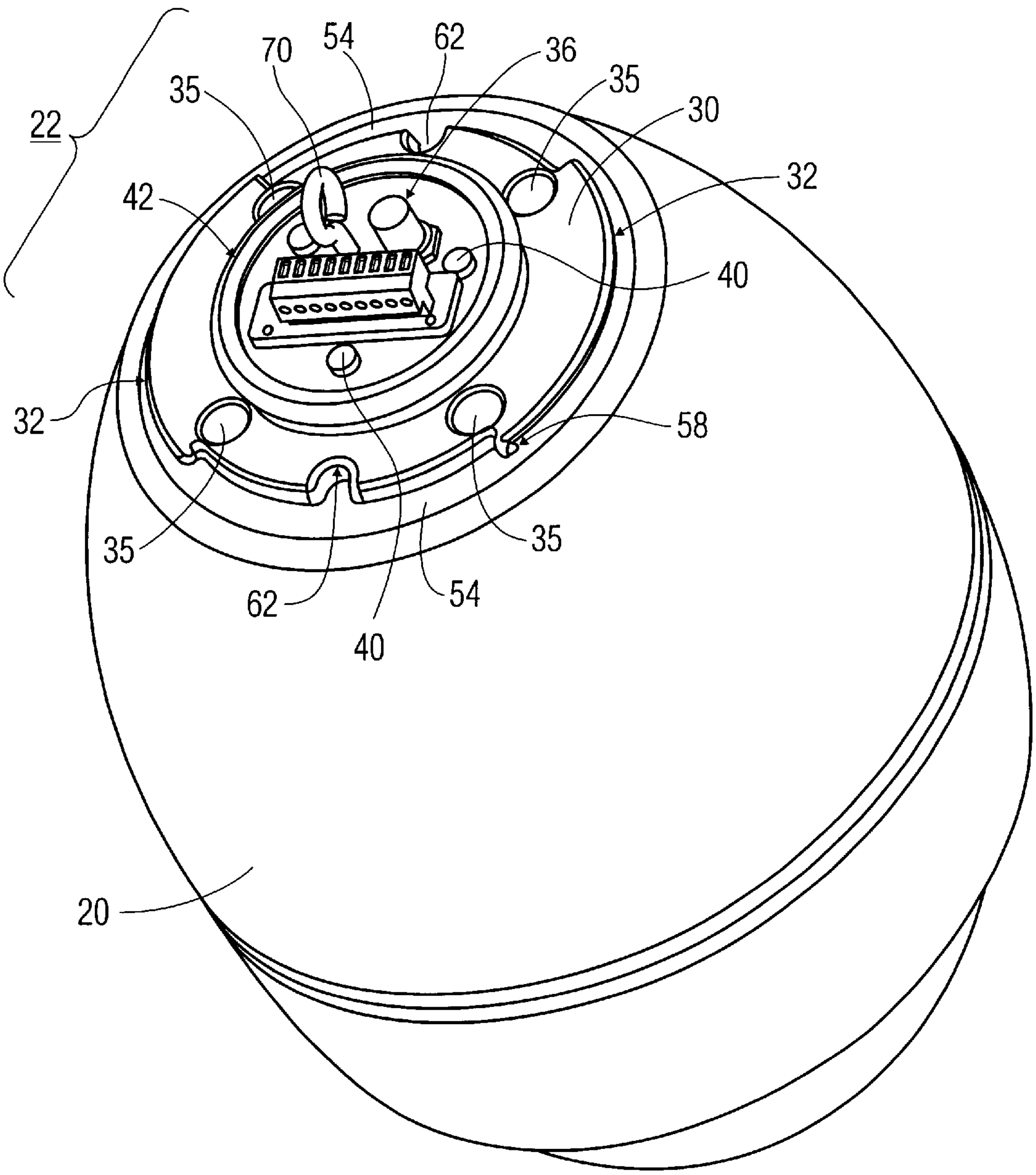
FIG. 6 is plan perspective view of a mounting means and a housing used in the invention.

Continuing with reference to FIGS. 3 and 4 and making further reference to FIG. 5, interior flanges 28 are disposed on approximately half of the circumferential edge of mounting cap 24. The other half of the circumferential edge of mounting cap 24 contains voids 50 which exist where interior flanges 28 would have been, and further contains screw receiving portions 52. Similarly, as is shown in FIG. 6, exterior flanges 32 cover approximately half of the circumferential edge of crown plate 30. The other half of the circumferential edge of crown plate 30 contains voids 54.

As can be seen most clearly from FIG. 3, exterior flanges 32 extend to the furthest position from central axis 56. By placing exterior flanges 32 at this position, two distinct strength factors are realized. First, the circumference of these flanges is larger thereby creating more bearing area to reduce the stress induced upon the flanges themselves. Second, the large off-axis distance allows for more stress to be transmitted through torque loads at the interface between housing 20 and mounting cap 24.

Referring to FIGS. 3–6, in operation, a surveillance camera (not shown) is placed within housing 22 with all electrical connectors 36 which must be accessible to an installer, being disposed near the hollow portion of radial gasket 42 and thus near the center of crown plate 30. If desired, a safety cable eyehook 70 may be disposed near electrical connectors 36. Housing 20, along with mounting means 22 are engaged with mounting cap 24 by placing exterior flanges 32 in voids 50 and simultaneously placing interior flanges 28 in voids 54. Housing 20 and mounting means 22 are further lifted so that a horizontal plane defined by exterior flanges 32 is higher than a corresponding horizontal plane defined by interior flanges 28. Housing 20 and mounting means 22 are then rotated a quarter turn about housing 20's long axis thereby placing exterior flanges 32 above interior flanges 28 and allowing exterior flanges 32 to be supported by interior flanges 28 as is shown most clearly in FIG. 3.

Figure 7:
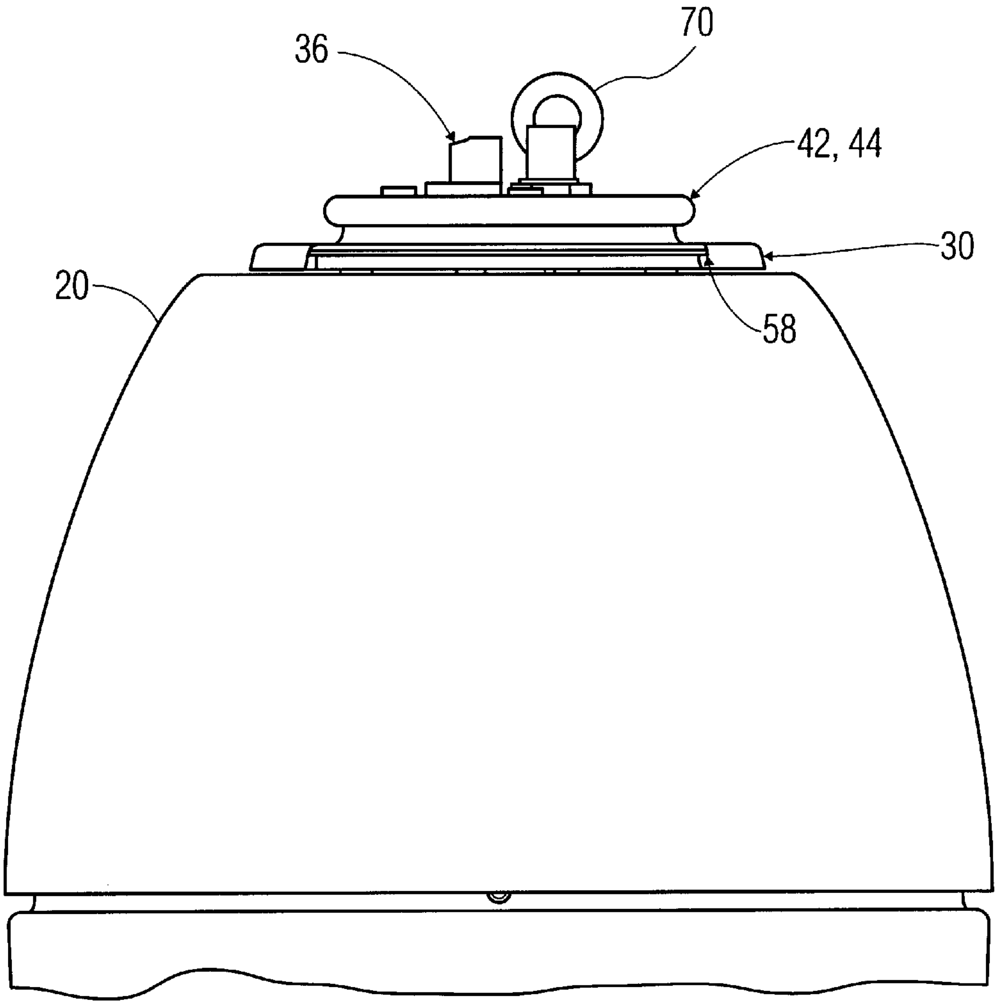
FIG. 7 is a side elevational view of a housing and mounting means used in the invention.

Referring to FIG. 7, rib extensions 58 are disposed at both ends of exterior flanges 32. At a first end of exterior flange 32, rib extension 58 completely inhibits rotation of housing 20 and mounting means 22. At a second end of exterior flange 32, rib extension allows rotation of housing 20 and mounting means 22 only if housing 20 and mounting means 22 are initially raised vertically. Rib extension 58 thus prevents unintentional disengagement due to applied gravitational forces. Removal of housing 20 requires a user to lift housing 20 vertically and rotate housing 20 about its long axis in a direction opposite that which was used to insert housing 20.

Referring to FIGS. 4–6, mechanical engagement of housing 20 and mounting means 22 with mounting cap 24 is further enhanced with the provision of anti-rotation screws 60. Antirotation screws 60 supplement rib extensions 58 by further inhibiting any rotation of housing 20. When exterior flange 32 and interior flange 28 are engaged, anti-rotation screw 60 is threaded through screw receiving portion 52 in mounting cap 24 into a notch 62 disposed in an exterior portion of crown plate 30. As shown most clearly in FIG. 4, anti-rotation screws 60 are mounted generally vertically so as to improve the aesthetics of the apparatus while still maintaining accessibility for an installer. Anti-rotation screws 60 are disposed on crown plate 30 at a position which is radially external to radial gasket 42 so that any water seeping through the screw threads will flow through the gap between mounting cap 24 and housing 20 and will not enter the inside of housing 20. Alternatively, anti-rotation screws could be replaced with spring-loaded detents (not shown) for effecting the same purpose.

Mounting cap 24 can be formed as an extension of any mount. For example, a wall mount arm extension could terminate in a structure like mounting cap 24. In such an embodiment, the external surfaces on the mounting arm could be further structured to blend with housing 20. The mounting cap could further contain a small circumferential step disposed radially upon it to indicate where housing 20 ends and mounting cap 24 begins.

Therefore, by placing the mounting means and the electrical connector near each other, an installer is provided with the ability to quickly and conveniently access and install a surveillance camera housing to a mount. Additionally, minimal stress is placed on the electrical wires, a high level of mechanical strength and reliability are realized, and aesthetics are maintained. The camera is hard wired in the factory and so no time-consuming or costly connection device is required during installation. Furthermore, the camera and the housing are all in one subassembly and so the camera is protected during handling.

Having described the preferred embodiments it should be made apparent that various changes could be made without departing from the scope and spirit of the invention which is defined more clearly in the appended claims.

Figure 8A:
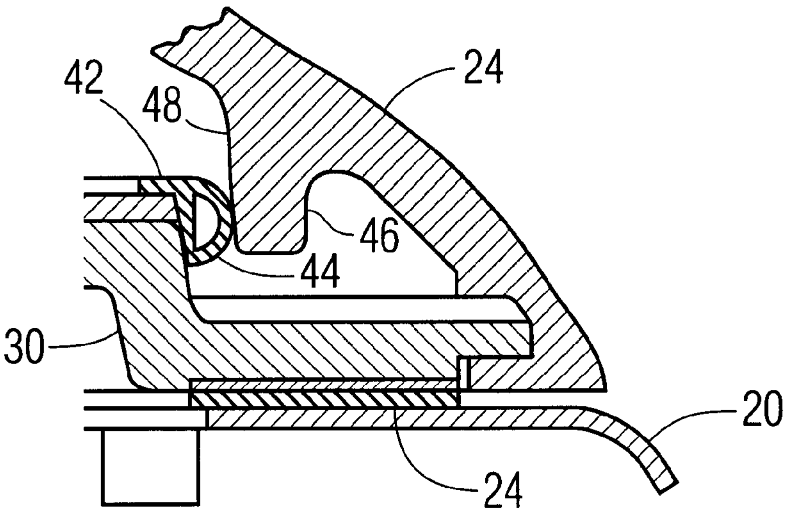
FIGS. 8A–8D are magnified side elevational views showing different embodiments of a radial gasket used in the invention.
Figure 8B:
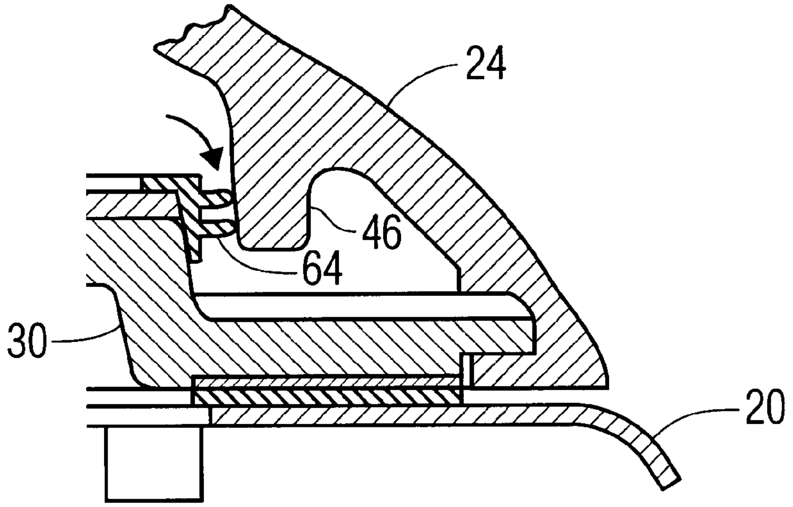
Figure 8C:
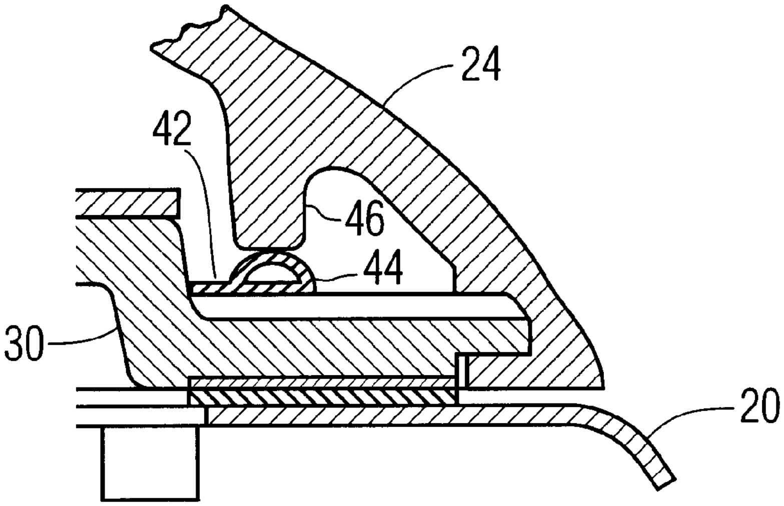
Figure 8D:
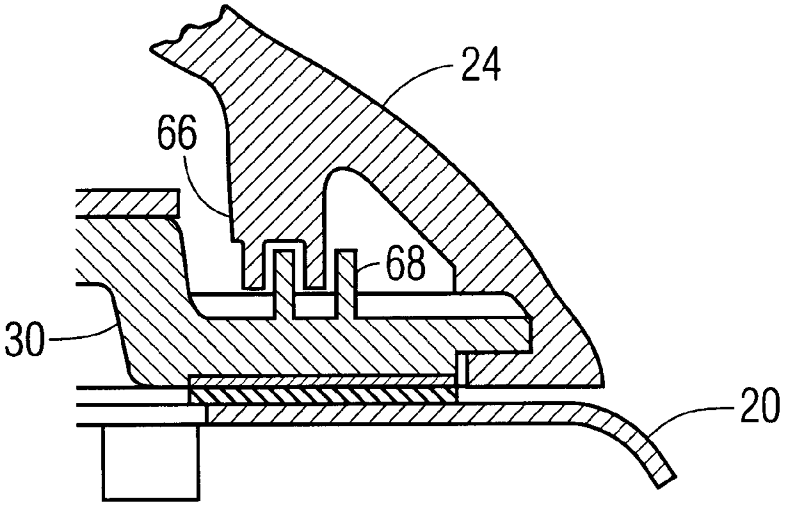

For example, referring to FIG. 8B, the circumferential edge 44 of radial gasket 42 could include a plurality of radially extending protrusions or fingers 64 (like an open bulb) instead of a hollow bulb shape as in FIG. 8A. As shown in FIG. 8C, radial gasket 42 could be disposed about crown plate 30 so that circumferential edge 44 is compressed axially instead of radially. Radially gasket 42 and inward extension 46 could be replaced by a first labyrinth portion 66 and a second labyrinth portion 68 designed to interlock with each other. Clearly, this labyrinth interlocking would not provide a true seal but the defined tortuous path would discourage ingress of contamination.

Similarly, internal surface 48 of mounting cap 24 need not be cylindrical. For example, the external surface of crown plate 30 or the internal surface of mounting cap 24 could be tapered to effectuate engagement of the elements.

Interior flange 28 and exterior flange 32 which provide mating engagement between housing 20 and mounting plate 24 need not be flange shaped. They could, for example, embody keying features wherein a series of protrusions and voids mesh and interlock providing mating ingress and egress in one position and providing support of housing 20 in another position. The flanges could also embody a series of protrusions of variable size thereby providing a cam action tightening the mounting cap-housing interface.

What is claimed is:

1. A surveillance camera housing comprising:

a mounting means having a one-piece unitary crown plate, said crown plate having a first radially extending flange for engagement with a corresponding second radially extending flange in a one-piece unitary mounting cap; and an electrical connector disposed within said one-piece unitary crown plate;

wherein said crown plate further includes a plurality of notches for receiving a plurality of anti-rotation screws, said anti-rotation screws prohibiting movement between said first radially extending flange and said second radially extending flange.

2. The surveillance camera housing as claimed in claim 1 further comprising a radial gasket disposed upon said crown plate.

3. The surveillance camera housing as claimed in claim 2 where said radial gasket has a circumferential edge that is one of a bulb-shape, and a plurality of radially extending fingers.

4. The surveillance camera housing as claimed in claim 1 further comprising first labyrinth portions disposed on said crown plate for engaging with second labyrinth portions in said mounting cap, said labyrinth portions discouraging ingress of contaminants into said housing.

5. The surveillance camera housing as claimed in claim 1 further comprising a safety eye hook disposed proximate to said electrical connector.

6. The surveillance camera housing as claimed in claim 1 wherein said first radially extending flange includes at least a first and second rib portion for limiting movement between said first radially extending flange and said second radially extending flange.

7. The surveillance camera housing as claimed in claim 1 wherein each of said first and second radially extending flanges comprise a plurality of flanges.

8. A method of connecting a housing including a mounting means, with a mount including a mounting cap, said method comprising:

providing a one-piece unitary mounting cap having a first flange;

providing a mounting means having a one-piece unitary crown plate with a second flange;

disposing electrical connectors in said housing;

inserting said housing with said mounting means into said mounting cap with said second flange entering said mounting cap in a position where said first flange is not present, and said first flange engaging said housing where said second flange is not present;

rotating said housing hereby causing said first flange to be disposed below said second flange;

placing said second flange on a crown plate;

placing a radial gasket on said crown plate; and disposing said electrical connectors in a central portion of said radial gasket;

wherein said crown plate further includes a plurality of notches for receiving a plurality of anti-rotation screws, said anti-rotation screws prohibiting movement between said first flange and said second flange.

9. The method as claimed in claim 8 wherein each of said first and second flanges comprise a plurality of flanges and all of said flanges extend radially.

10. The method as claimed in claim 8 further comprising providing at least a first and second rib portion for limiting movement between said first flange and said second flange.

11. The method as claimed in claim 8 further comprising: providing first labyrinth portions on said crown plate; and providing second labyrinth portions on said mounting cap, said first labyrinth portions being effective to mate with said second labyrinth portions.

12. The method as claimed in claim 8 wherein said mounting cap has an internal shape, said crown plate has an external shape, and said external and internal shapes are one of cylindrical and tapered.

13. The method as claimed in claim 8 wherein said radial gasket has a circumferential edge that is one of a bulb-shape, and a plurality of radially extending fingers.

14. The method as claimed in claim 8 further comprising disposing a safety eye hook proximate to said electrical connectors.

15. A surveillance camera housing coupled to a mounting through a mounting means, comprising:

a one-piece unitary mounting cap having a first radially extending flange;

a housing having a one-piece unitary crown plate, said crown plate having a second radially extending flange resting on said first radially extending flange; and an electrical connector disposed within said crown plate;

wherein said crown plate further includes a plurality of notches for receiving a plurality of anti-rotation screws, said anti-rotation screws prohibiting movement between said first radially extending flange and said second radially extending flange.

16. The combination as claimed in claim 15 further comprising a radial gasket disposed upon said crown plate.

17. The combination as claimed in claim 16 wherein said mounting cap includes inward extensions for deflecting said radial gasket.

18. The combination as claimed in claim 16 wherein said radial gasket has a circumferential edge that is one of a bulb-shape, and a plurality of radially extending fingers.

19. The combination as claimed in claim 15 further comprising first labyrinth portions disposed on said crown plate for engaging with second labyrinth portions in said mounting cap, said labyrinth portions discouraging ingress of contaminants into said housing.

20. The combination as claimed in claim 15 further comprising a safety eye hook disposed proximate to said electrical connector.

21. The combination as claim in claim 15 wherein said first radially extending flange includes at least a first and second rib portion for limiting movement between said, first radially extending flange and said second radially extending flange.

22. The combination as claimed in claim 15 wherein each of said first and second radially extending flanges comprise a plurality of flanges.

* * * * *